US012735136B2

(12) United States Patent
Bucchioni

(10) Patent No.: US 12,735,136 B2
(45) Date of Patent: Sep. 15, 2026

(54) STRADDLE TYPE VEHICLE PROVIDED WITH DETECTION UNIT

(71) Applicant: PIAGGIO & C. SPA, Pontedera (IT)

(72) Inventor: Marco Bucchioni, Pontedera (IT)

(73) Assignee: PIAGGIO & C. SPA, Pontedera (IT)

( * ) Notice: Subject to any disclaimer, the term of this patent is extended or adjusted under 35 U.S.C. 154(b) by 327 days.

(21) Appl. No.: 18/573,598

(22) PCT Filed: Jun. 27, 2022

(86) PCT No.: PCT/IB2022/055942
§ 371 (c)(1),
(2) Date: Dec. 22, 2023

(87) PCT Pub. No.: WO2023/275707
PCT Pub. Date: Jan. 5, 2023

(65) Prior Publication Data
US 2024/0227967 A1 Jul. 11, 2024

(30) Foreign Application Priority Data
Jul. 2, 2021 (IT) ........................ 102021000017489

(51) Int. Cl.
*B62J 45/42* (2020.01)
*B62J 45/41* (2020.01)
*G01S 13/931* (2020.01)

(52) U.S. Cl.
CPC ............... *B62J 45/42* (2020.02); *B62J 45/41* (2020.02); *G01S 13/931* (2013.01); *G01S 2013/93272* (2020.01)

(58) Field of Classification Search
CPC ................................ B62J 45/42; G01S 13/931
See application file for complete search history.

(56) References Cited

U.S. PATENT DOCUMENTS 3,870,340 A * 3/1975 Winter ............... B62D 53/0864 280/901
4,116,497 A * 9/1978 Schimpf ............. B62D 55/096 305/47
(Continued)

FOREIGN PATENT DOCUMENTS

CN 113147964 A 7/2021
JP 2001151016 A 6/2001
(Continued)

OTHER PUBLICATIONS

International Search Report for corresponding application PCT/IB2022/05592 filed Jun. 27, 2022; Mail date Mar. 24, 2022.
(Continued)

*Primary Examiner* — Jayanti K Patel
(74) *Attorney, Agent, or Firm* — CANTOR COLBURN LLP

(57) ABSTRACT

A straddle type vehicle comprising including a taillight arranged on a rear-carriage, a support bracket mounted to the rear-carriage and arranged above the taillight, where the support bracket is shaped to define at least one grip portion for a passenger, and a radar is provided, arranged on the rear-carriage and configured to detect the presence of other vehicles in a rear area, the radar being connected directly or indirectly to the support bracket and is arranged, according to a side view of the vehicle, in a position: below the support bracket, between said support bracket and said taillight, and cantilevered with respect to the taillight in a longitudinal extension direction towards the rear-carriage.

10 Claims, 2 Drawing Sheets

(56) References Cited

U.S. PATENT DOCUMENTS

| | | | | |
|---|---|---|---|---|
| 6,660,948 | B2 * | 12/2003 | Clegg | H01H 13/70 200/333 |
| 2005/0162325 | A1 * | 7/2005 | Tietjen | H01Q 9/36 343/757 |
| 2005/0236792 | A1 * | 10/2005 | Hedenberg | B60G 11/465 280/124.11 |
| 2006/0043776 | A1 * | 3/2006 | Rajasingham | B60N 2/42736 180/271 |
| 2006/0132370 | A1 * | 6/2006 | Tietjen | H01Q 3/26 343/757 |
| 2006/0232389 | A1 | 10/2006 | Chu | |
| 2019/0161041 | A1 * | 5/2019 | Fernandez | B60R 19/023 |
| 2020/0241129 | A1 | 7/2020 | Yu et al. | |
| 2021/0001945 | A1 | 1/2021 | Hagimoto et al. | |

FOREIGN PATENT DOCUMENTS

| | | | |
|---|---|---|---|
| JP | 2008100596 | A | 5/2008 |
| JP | 2009204592 | A | 9/2009 |
| JP | 2019039759 | A | 3/2019 |
| WO | 2019167220 | A1 | 9/2019 |
| WO | 2019186942 | A1 | 10/2019 |
| WO | 2019186948 | A1 | 10/2019 |
| WO | 2020129789 | A1 | 6/2020 |

OTHER PUBLICATIONS

Written Opinion for corresponding application PCT/IB2022/05592 filed Jun. 27, 2022; Mail date Mar. 24, 2022.

Japanese Office Action; Application No. 2023-580843; date of mailing: Apr. 21, 2026; 8 page.

* cited by examiner 35
30'
30
74
72
70
50
52
ECU

V
31
53
35
30'
30i
30
45
20i
54
30d
s
20d
20
4
50
52
21
40
T
6
1
15
17

STRADDLE TYPE VEHICLE PROVIDED WITH DETECTION UNIT

TECHNICAL FIELD

The present disclosure applies to the field of two- or three-wheeled straddle type vehicles, and in particular relates to a straddle type vehicle provided with a radar for detecting the presence of other surrounding vehicles during driving.

BACKGROUND

The application of arranging one or more detection or radar devices for a straddle type vehicle, such as a two- or three-wheeled motorcycle or scooter, is known.

Indeed, motorcycles are subject to a risk of collision by the vehicles behind them more than other vehicles, such as cars, for example. Therefore, there is a need to alert the driver of the vehicle about the presence of other vehicles or cars following or close to the motorcycle itself so that the driver is informed on the situation surrounding the motorcycle, so that he/she can respond actively and in advance, for example with a related driving maneuver, to any hazardous situations that may arise.

In this specific application, the position of the radar device on the vehicle and the functional efficiency thereof are important in order to make the information transmitted to the driver as accurate as possible.

Mounting the radar device in different positions on the vehicle is known. For example, US20210001945A1 describes a radar device applied to the rear-carriage of a two-wheeled motorcycle.

In particular, the device is arranged on the tail of the rear-carriage in a position between the taillight of the vehicle and the support portion accommodating the license plate of the vehicle. The license plate support portion extends, in turn, from the rear-carriage, and in detail from a portion of the rear-carriage tail, so as to be contiguous with respect to the latter.

However, this positioning partially shields the view of the radar. Indeed, the extension of the license plate support portion limits the field of view of the instrument, thus decreasing its performance in terms of efficiency.

WO2019186942A1 provides a detection unit arranged inside the rear optical unit of the headlight. In this case, the detection unit is integrated in the optical unit and thus concealed. In this embodiment, the detection unit can be affected by the operation of the light sources of the headlight, for example by the stop lights, when activated.

BRIEF SUMMARY

The disclosure provides a straddle type vehicle provided with at least one detection unit which allows optimizing the efficiency of the radar device so as to increase the field of view thereof.

The disclosure further provides a straddle type vehicle provided with at least one detection unit which allows decreasing the drawback and occurrence of false signals of the instrument.

A straddle type vehicle comprises:

- a taillight arranged on a rear-carriage, where said taillight is adapted to emit a light beam towards a rear direction of the vehicle;
- a support bracket arranged on the rear-carriage and comprising at least one grip portion for a passenger, where said support bracket, in a side view of the vehicle, is arranged above the taillight;
- a radar arranged in the rear-carriage and adapted to detect the presence of other vehicles in a rear area,
- wherein said radar is directly or indirectly connected to said support bracket in a position, according to a side view of the vehicle:
  - below said support bracket, and
  - between said support bracket and said taillight, and cantilevered with respect to the taillight on the side of said rear-carriage.

In particular, the radar is positioned in a cantilevered manner on the rear-carriage along a longitudinal extension direction of the vehicle.

Thereby, the radar positioned on the rear-carriage protruding in a cantilevered manner with respect to the taillight allows having a completely free field of view not shielded by the other components. Therefore, the radar is provided in the distalmost position in the longitudinal direction on the vehicle, while being however small in the overall longitudinal size thereof. Additionally, in this position, the radar is protected and shielded by the support bracket. The support bracket protects it from the top and also laterally against possible shocks or damage. This positioning does not require any modification to the vehicle, both on the frame and/or components or shape of the fairings.

In particular, the cantilevered position of the radar with respect to the taillight defines an open space below said radar, which extends:

- in a longitudinal direction, between a distal end of said taillight and a distal end of said radar, and
- in a vertical direction, orthogonal to said longitudinal direction, between a lower end of said radar up to extending to at least a lower end of said taillight.

Thereby, the free space below the radar, both in longitudinal and transverse direction, avoids any emission interference of the signal towards the rear-carriage, thus improving the detection of the radar, in particular the detection of vehicles following the motorcycle and which are close to and adjacent to the motorcycle itself.

In particular, the support bracket defines a first grip portion and a second grip portion opposite to each other with respect to a longitudinal extension direction of the vehicle.

In particular, the support bracket longitudinally extends between a first end portion, in which it is connected to a rear-carriage frame portion of the vehicle, and a second end portion, opposite to the first end portion, which is cantilevered with respect to the taillight. The taillight is placed on a rear-carriage tail portion of the vehicle. The support bracket is connected directly or indirectly to the rear-carriage tail portion of the vehicle and protrudes in a cantilevered manner with respect thereto, and accordingly with respect to the taillight.

In particular, a housing space is defined at the second end portion, in a position below the support bracket and between the latter and the taillight. The detection unit, in particular a radar, is placed in said housing space. In other words, such a housing space is defined in the area below the support bracket protruding with respect to the rear-carriage tail portion and the taillight. The latter is integrated in a fairing which covers the rear-carriage of the vehicle and defines the aforesaid rear-carriage tail portion.

Thereby, the radar is arranged—in a side view of the vehicle in a configuration with straight wheels—past the end of the rear-carriage tail portion, i.e., in a cantilevered manner with respect to the latter, in a direction towards the rear-carriage along the longitudinal extension direction. The rear-carriage tail portion, or simply the rear-carriage, substantially is the rear frame and/or fairing portion of the vehicle extending above the rear wheel. In other words, the rear-carriage tail portion is the rear end part of the vehicle extending above the rear wheel and supporting the taillight. The latter faces a rear area of the vehicle itself and emits a light beam therein. Taillight means the optical unit integrated in the rear-carriage frame portion, including at least one light source for making the vehicle visible at night, and further comprises a stop light which is selectively activated when the brakes are actuated.

Additionally, the optical unit preferably also comprises the direction lights.

In a first embodiment, the radar is arranged onboard the rear-carriage tail portion in the position—as defined above—below the support bracket and between the latter and the taillight. In this case, the radar is arranged to be integral with the rear-carriage tail portion of the vehicle, and therefore it is connected directly to the latter.

In a second, more advantageous embodiment, the radar is arranged onboard the support bracket. In this case, the radar is arranged to be integral with the support bracket, and therefore it is directly connected to the latter. Therefore, the support bracket and the radar form a single piece. In this case, as described in detail below, the support bracket with the integrated radar may form an accessory which can be retrofitted to existing vehicles.

In both embodiments described above, the radar can be supported by the support bracket and/or the rear-carriage frame portion or by a fastening which includes a combination of couplings on the support bracket and on the rear-carriage frame portion. This constructional aspect results in an improved mounting rigidity of the radar on the vehicle capable of suppressing the fluctuations in the detection cone thereof due to vibrations during driving.

Moreover, the above-described positioning of the radar allows decreasing false detections due, for example, to the shape of the road (effects of the road surface), thus simultaneously ensuring an improved and broader field of view.

Moreover, with such a configuration, the arrangement of the radar is advantageous in terms of impermeability and dirt resistance, since it is at least protected from the influence of water, dust and the like.

According to another advantageous aspect, since the radar is placed in a protruding position with respect to all the other rear-carriage parts of the vehicle, its detection efficiency is improved. As a result, the detection is more reliable because the false detections due to the influence of other parts of the vehicle (for example, the license plate) by the radar are substantially reduced to zero.

Advantageously, the radar comprises a detection screen, said detection screen being arranged according to a longitudinal extension axis in a front-rear direction of the straddle type vehicle in a position at least equal to the end position of the rear license plate or of an end portion of the rear-carriage.

Thereby, the false detections due to the influence of other members of the vehicle are decreased, thus ensuring improved detection performance and an increased field of view of the radar.

Advantageously, the housing space comprises a container, in particular of the box-like type open on at least one rear face. The container is shaped to accommodate the detection unit while keeping a detection screen thereof visible—facing the rear of the vehicle. Thereby, the box-like container covers and protects the radar so that it is integrated in a concealed manner while keeping only the detection screen visible. This embodiment allows arranging the various cables of the radar inside the box-like container, thus maintaining a clean and compact appearance of the motorcycle.

Preferably, the box-like container is integrally mounted to the support bracket at a lower face thereof facing the ground in use. Thereby, the box-like container is fixed at least on top of the support bracket, thus being integrated in the latter. Alternatively or in combination, the connection and fixing of the box-like container can also occur with the rear-carriage frame portion.

In particular, the support bracket symmetrically extends on opposite sides with respect to the longitudinal direction and comprises a support plate arranged at the second end. The box-like container is shaped to be coupled at the top to the support plate so as to contain and protect the radar. Thereby, the upper support plate thus forms an upper wall of the box-like container to which it is fastened.

Preferably, means for adjusting the position of the radar can be provided. Said position adjusting means allow adjusting the position thereof with respect to the other parts of the motor vehicle. For example, sliding guides can be provided, which allow the movement according to the longitudinal direction, but also simultaneously or alternatively, according to a vertical direction.

Said adjusting means can be actuated and controlled by means of a vehicle control unit itself. In particular, a movement actuator is provided, which allows adjusting the position of the radar moving along the sliding guides.

Thereby, the arrangement of the position adjusting means of the radar allow adjusting its position to improve the detection efficiency thereof, for example as a function of the load present on the motorcycle. This can become necessary, for example, when the attitude of the vehicle changes, for example when a passenger is present or not, or when there are auxiliary loads such as suitcases or luggage. In addition to changing the attitude of the vehicle, and thus the incidence and relative position of the radar, the latter can partially shield the detection cone of the instrument, whereby the position adjustment allows arranging the latter in a more efficient position.

BRIEF DESCRIPTION OF THE DRAWINGS

Further advantages and additional features of the present disclosure are highlighted by the following description of some embodiments, given by way of non-limiting examples, with reference to the accompanying drawings, in which.

DETAILED DESCRIPTION

Figure 1:
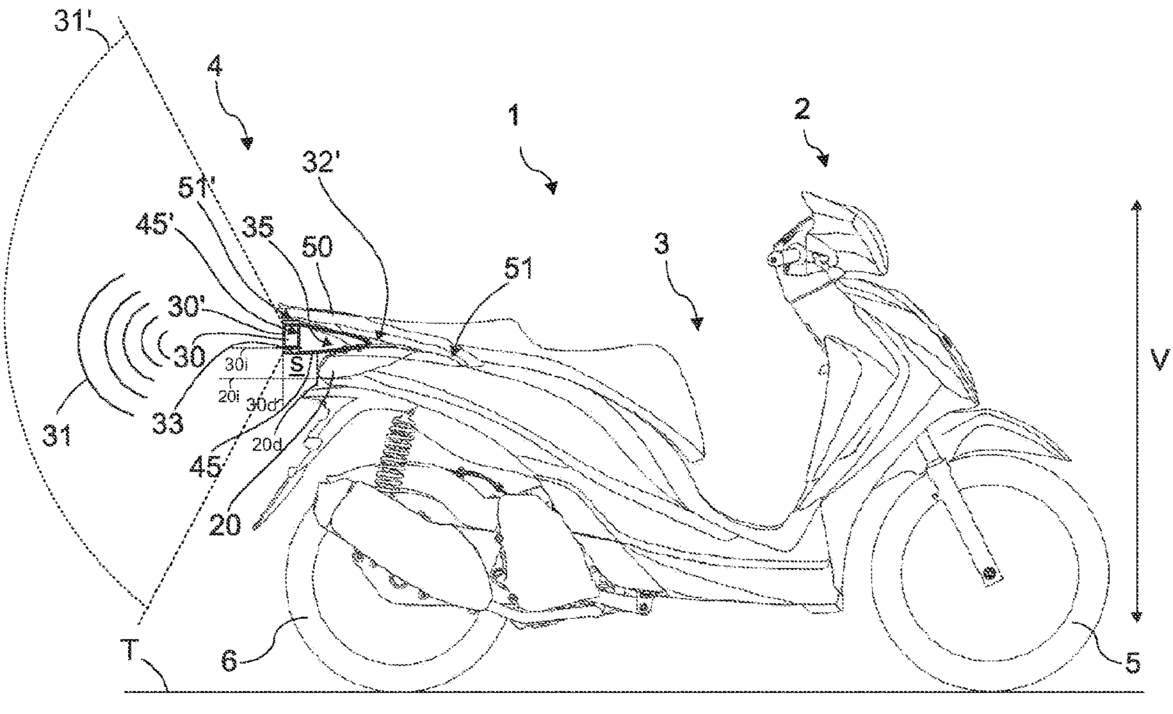
FIG. 1 shows a side view of a straddle type vehicle, in particular a scooter, provided with a radar positioned on the rear-carriage according to the present disclosure.

Equal or similar elements are indicated by the same reference numerals in the accompanying drawings.

With reference to FIG. 1, a straddle type vehicle 1, such as a scooter, is shown.

The accompanying drawings show an embodiment of a motorcycle 1, which in the particular example is embodied, without however introducing any limitation, by a two-wheeled motorcycle 1, and in particular, by a two-wheeled scooter having a front wheel 5 and a rear wheel 6, or again by a three-wheeled tricycle having at least two steering and tilting front wheels, or a quadricycle with two pairs of tilting wheels at least two of which are steered.

Hereinafter in the present description, reference will be made to a general motorcycle 1, meaning that the following description is generally applicable to any type of L-category motorcycle 1 comprising a motorcycle body 2,3,4; at least two wheels 5, 6 constrained to the motorcycle body 2,3,4; a traction motor 7, for example a heat and/or electric or hybrid motor, constrained to the motorcycle body 2,3,4 and operatively connected to at least one of the two wheels 5, 6. The motorcycle body thus comprises a front part 2, a middle part 3 provided with a saddle 15, and a rear part 4 or rear-carriage.

Motorcycle 1 further comprises a taillight 20 arranged on the rear-carriage 4. The taillight 20, also referred to as the light 20 below, is shaped to emit a light beam on a rear side.

A passenger support bracket 50 arranged above the taillight 20 is also provided. The support bracket 50 defines side grip portions 52 for a passenger of motorcycle 1, seating behind a driver.

A radar 30 adapted to detect the presence of other vehicles behind motorcycle 1 is also provided. The radar 30 is directly or indirectly connected to the support bracket 50.

The radar 30 is in a position, according to a side view of the vehicle (see FIGS. 1 and 3), below the support bracket 50, and between the support bracket 50 and taillight 20. The radar 30 is positioned along the longitudinal direction L (FIG. 2) in a cantilevered manner with respect to taillight 20, on the side of the rear-carriage 4. In other words, radar 30 is positioned in a cantilevered manner on the rear-carriage 4 along the longitudinal extension direction L of the vehicle.

Thereby, radar 30 is in a more distal position of the rear-carriage in the longitudinal direction L, while being however comprised in the overall length of the motorcycle, measured between fore-carriage and rear-carriage of the motorcycle. In this position, the radar 30 is below the support bracket 50, in particular below a support plate 53 (FIG. 2) of the support bracket 50. The support surface 50' thus protects it at the top in addition to on the side, the latter having a broader transverse size, whereby the radar 30 is shielded from possible shocks or damage, in addition to dirt or bad weather. It should be noted that this positioning of radar 30 does not require any structural modification to the vehicle, both on the frame and/or components or shape of the fairings, or again of the support bracket 50. In further constructional aspects, the support bracket 50 laterally embraces a rear-carriage frame portion 32' on opposite sides so that the grip portions 52 are positioned at a rear saddle portion 41 accommodating the passenger.

In a preferred embodiment shown in FIGS. 1 and 3, which contributes to optimizing the detection thereof, the cantilevered position of radar 30 with respect to taillight 20 defines a free space S below the radar 30 itself. In particular, the free space S extends:

- in the longitudinal direction L, between a distal end 20*d* of taillight 20 and a distal end 30*d* of radar 30, and
- in a vertical direction V, orthogonal to the longitudinal direction L, between a lower end 30*i* of radar 30 up to extending to at least a lower end 20*i* of taillight 20.

Thereby, the free space S below radar 30, both in longitudinal L and vertical V direction, avoids any emission interference of the signal 31 towards the rear-carriage. This particular solution allows optimizing the detection of other following vehicles by the radar 30, when the latter are at a short distance or in a lateral space in which they are partially adjacent the motorcycle itself. In other words, the free space S allows increasing the field of view of radar 30, in particular the radar cone 31' (FIG. 2), both along the longitudinal direction L since it is close to 180°, and in the vertical direction V (FIG. 1). This means greater detection coverage, which is for example useful under conditions of heavy traffic and smaller vehicles, such as bicycles and the like.

In particular, the support bracket 50 longitudinally extends in direction L, between a first end portion 51, in which it is connected to a rear-carriage frame portion 32' (FIG. 1) of the vehicle, and a second end portion 51', opposite to the first end portion 51, which is cantilevered with respect to the rear-carriage 4 of the vehicle, and in particular cantilevered with respect to taillight 20.

A housing space 35 is defined at the second end portion 51', in a position between the support bracket 50 and taillight 20.

In particular, radar 30 is placed in the housing space 35. Thereby, radar 30 is arranged—in a side view of the vehicle (FIGS. 1 and 3)—in a cantilevered position with respect to the rear-carriage 4. Rear-carriage 4 means the tail of the motorcycle, i.e., the rear end part of the vehicle extending above the rear wheel 6 and supporting the taillight 20.

Therefore, in a side view and according to a top-to-bottom direction, the radar 30 is in a position between the support bracket 50 and taillight 20.

The housing space 35 is frontally open on a face facing the rear-carriage of the vehicle. The housing space 35 is shaped to accommodate the detection unit 30 so that the detection screen of the instrument is placed at the open face of the housing space and also faces the rear-carriage of the vehicle.

For example, the housing space comprises a box-like container 45 open on a face 45' (FIG. 1), capable of accommodating and protecting the radar 30. Therefore, the only visible part of the instrument is the detection screen 30' of the instrument.

In a preferred embodiment, the box-like container 45 is integrally mounted to the support bracket 50 at the lower face thereof, facing ground T in use.

Figure 2:
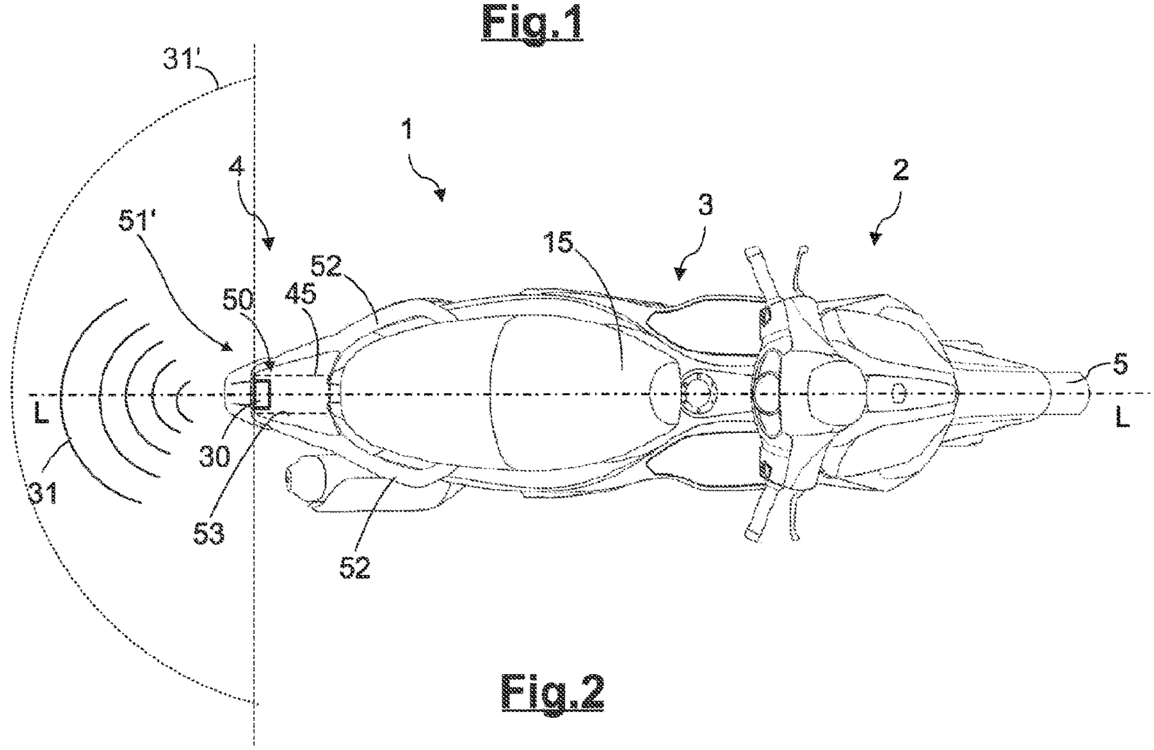
FIG. 2 shows a top view of the straddle type vehicle, in particular the scooter in FIG. 1, provided with the detection unit according to the present disclosure.

From a constructional point of view, the support bracket 50 extends longitudinally with respect to the vehicle and is symmetrically shaped on opposite sides with respect to the longitudinal direction L (FIG. 2). The support bracket 50 further comprises the support plate 53 arranged at the rear end 51' thereof. The support plate 53 is shaped to accommodate a top box (not shown) which can be removably fixed thereto by dedicated coupling means.

The support plate 53 thus defines a base and an overlying cover for radar 30. Therefore, the box-like container 45 can be shaped to be coupled at the top to the support plate 53 so as to contain and protect the radar 30.

In an alternative embodiment, radar 30 is connected in a cantilevered manner to the rear-carriage 4, in particular to the frame portion 32'. In this case, radar 30 is arranged to be integral with the rear-carriage frame portion 32' of the vehicle, in the position below the passenger support bracket 50.

In a first aspect of the disclosure, since radar 30 is supported by the support bracket 50 being directly connected to the rear-carriage frame portion 32', an improved mounting rigidity of radar 30 to the vehicle is determined, being capable of suppressing the fluctuations in the detection angle due to vibrations generated during driving.

Advantageously, in a side view, radar 30 is arranged so that the rear end thereof, according to the longitudinal extension direction of motorcycle 1, is located in a position which is at least equal to the end position of the support bracket 50 in the front-rear direction of the vehicle. Therefore, the radar 30 protrudes over the rear-carriage 4 and with respect to taillight 20, or is at least in line when seen from the side with the end 51' of the support bracket 50 facing the rear-carriage 4. Therefore, the radar 30 is also substantially in line, again when seen from the side, with the rear fender and/or license plate of the vehicle. Thereby, this positioning allows the radio waves 31 to propagate without hitting other vehicle parts or portions on the rear-carriage. As mentioned above, this contrivance allows decreasing the false detections due to the influence of other members of the vehicle, thus ensuring improved detection performance as a function of an increased field of view of radar 30.

In other words, since the radar 30 is placed in a protruding position with respect to all the other parts of the rear-carriage 4 of the vehicle, its detection efficiency is improved. As a result, detection is more reliable because the false detections due to the influence of other members of the vehicle (for example, the license plate) by the radar 30 are substantially reduced to zero. In other constructional aspects, as shown in FIG. 1, damping elements 33 adapted to damp the vibrations of radar 30 during driving are provided. For example, rubber elements interposed around the radar 30, for example in both the lower part and the upper part, are arranged. Such damping elements 33 allow decreasing the vibrations transmitted to radar 30 during driving, thus ensuring improved stability thereof and therefore more reliable performance.

Figures 3, 3A:
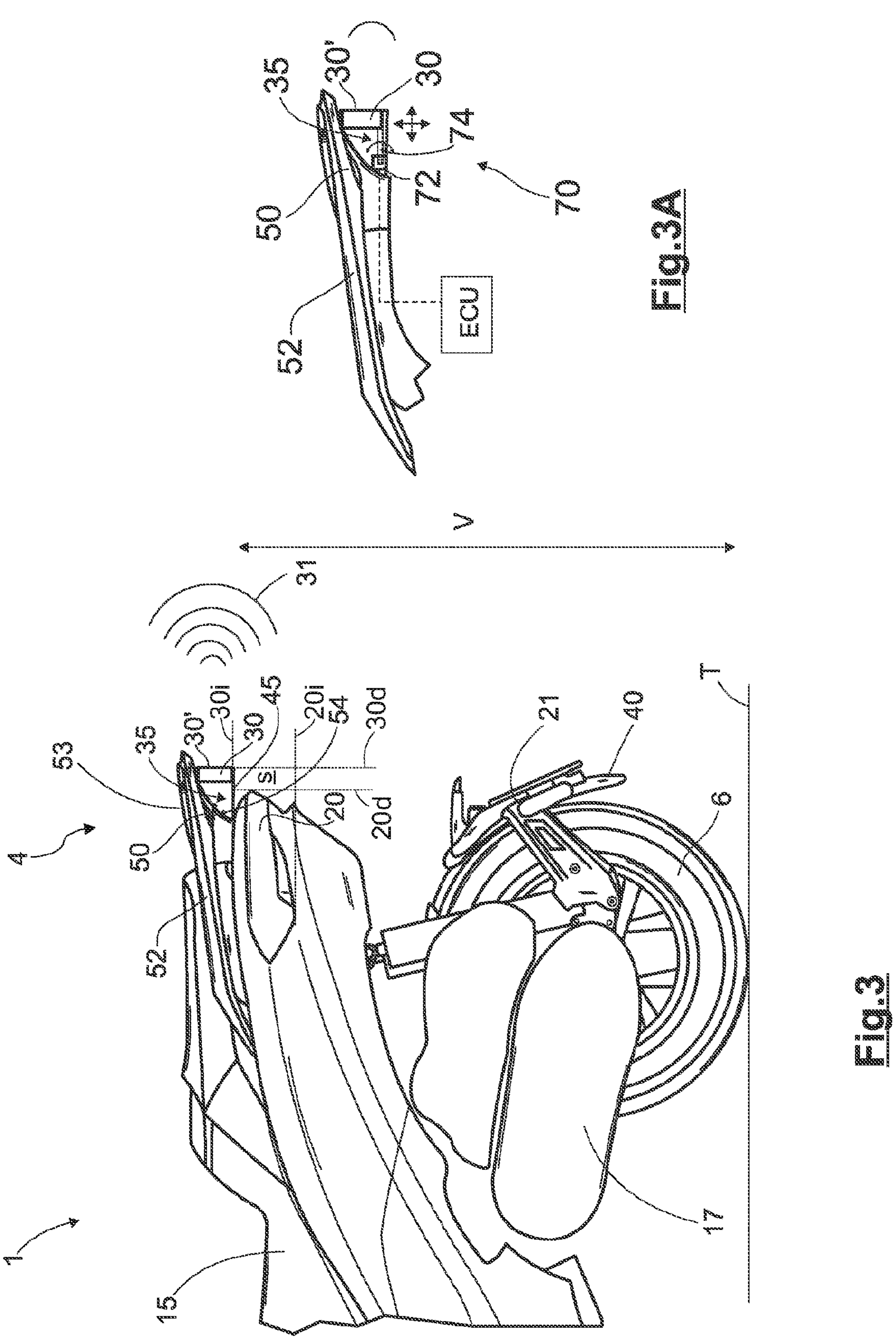
FIG. 3 shows a partial side view of the rear-carriage of a motorcycle, in particular a scooter, which shows the arrangement of the radar according to the present disclosure.
FIG. 3A shows a diagrammatic view of means for adjusting the position of the radar.

In another advantageous aspect diagrammatically shown in FIG. 3A, means for adjusting the position of radar 30 can be provided. The position adjusting means allow adjusting the position of radar 30 with respect to the support bracket 50, or however with respect to the rear-carriage 4 of the vehicle.

For example, sliding guides 74 allowing the longitudinal or transverse movement or rotation can be provided to allow radar 30 to be moved according to the longitudinal direction L, but simultaneously or alternatively, also according to the vertical direction V, in order to adjust the height position thereof.

In a preferred embodiment, said adjusting means 70 can comprise an actuator 52 and are controlled by means of a control unit, for example the ECU of the vehicle itself. A button on the handlebar of the vehicle can be provided, which allows the movement thereof, for example. In particular, the position adjustment is of the type actuated by means of an actuator 72 which allows moving the radar 30 which moves along sliding guides 74.

The above description of one or more specific embodiments is capable of showing the disclosure from a conceptual point of view so that others, using the prior art, will be able to change and/or adapt the embodiments in various applications without further research and without departing from the inventive concept, and therefore it is understood that such adaptations and changes will be considerable as equivalents of the specific embodiment. The means and materials for carrying out the various functions described may be of various nature without departing from the scope of the disclosure. It is understood that the expressions or terminology used have a merely descriptive and thus non-limiting purpose.

The invention claimed is:

1. A straddle type vehicle comprising:

a taillight arranged on a rear-carriage, a support bracket mounted to the rear-carriage and arranged above said taillight, wherein the support bracket is shaped to define at least one grip portion for a passenger;

a radar arranged on the rear-carriage and configured to detect the presence of other vehicles in a rear area of said straddle type vehicle, wherein said radar is connected directly or indirectly to said support bracket and is arranged, according to a side view of the vehicle, in a position:

below said support bracket, between said support bracket and said taillight, and cantilevered with respect to said taillight in a longitudinal extension direction towards the rear-carriage.

2. A straddle type vehicle according to claim 1, wherein the cantilevered position of the radar with respect to the taillight defines an open space below said radar, which extends:

in said longitudinal direction between a distal end (of said taillight and a distal end (of said radar, and in a vertical direction, orthogonal to said longitudinal direction, between a lower end (of said radar up to extending to at least a lower end (of said taillight.

3. A straddle type vehicle according to claim 1, wherein said radar is arranged onboard the support bracket.

4. A straddle type vehicle according to claim 1, wherein said support bracket extends according to said longitudinal direction between a first end portion, in which it is connected to a rear-carriage frame portion (of the vehicle, and a second end portion (, opposite to the first end portion, which is cantilevered with respect to the rear-carriage frame portion (, wherein a housing space is defined at said second end portion (, in a position in the vertical direction between the support bracket and the taillight, the radar being placed in said housing space.

5. A straddle type vehicle according to claim 4, wherein said housing space comprises a box-like container open on one face (and capable of receiving the detection unit while keeping a detection screen (of the radar visible and facing the rear side of the vehicle, in particular said box-like container is integrally mounted to the support bracket at a lower face thereof facing the ground in use.

6. A straddle type vehicle according to claim 5, wherein said support bracket extends symmetrically on opposite sides with respect to said longitudinal direction and comprises a support plate arranged at said second end (, wherein said box-like container is shaped to be coupled at the top to the support plate so as to contain and protect the radar.

7. A straddle type vehicle according to claim 6, wherein said radar is arranged so that the detection screen (is arranged, in a side view and according to said longitudinal direction, in a position substantially in line with the second end (of the support bracket.

8. A straddle type vehicle according to claim 1, wherein damping means are provided, which comprise damping elements adapted to damp the vibrations of the radar during driving, in particular said damping elements are rubber elements interposed around said radar.

9. A straddle type vehicle according to claim 1, wherein means for adjusting the position of the radar are provided, wherein said position adjusting means comprise sliding guides which allow the movement according to said longitudinal and/or vertical direction of the radar.

10. A straddle type vehicle according to claim 1, wherein said adjusting means comprises an actuator controlled by a control unit, which allows adjusting the position of the radar moving along said sliding guides.

* * * * *